(12) United States Patent  
VerSteeg (10) Patent No.: US 7,870,465 B2  
(45) Date of Patent: Jan. 11, 2011

(54) REDUCING CHANNEL-CHANGE TIME

(76) Inventor: William C. VerSteeg, 330 Guildhall Grove, Alpharetta, GA (US) 30022

( * ) Notice: Subject to any disclaimer, the term of this patent is extended or adjusted under 35 U.S.C. 154(b) by 1018 days.

(21) Appl. No.: 11/550,441

(22) Filed: Oct. 18, 2006

(65) Prior Publication Data
US 2008/0109692 A1 May 8, 2008

(51) Int. Cl.
*H03M 13/00* (2006.01)
(52) U.S. Cl. .............. 714/774; 375/240.25; 375/240.27
(58) Field of Classification Search ................. 714/774; 375/E7.211, E7.27, 240.25, 240.27
See application file for complete search history.

(56) References Cited

U.S. PATENT DOCUMENTS

| | | | |
|---|---|---|---|
| 5,572,347 A | 11/1996 | Burton et al. ................ 359/124 |
| 5,594,509 A | 1/1997 | Florin et al. | |
| 5,600,663 A | 2/1997 | Ayanoglu et al. ............ 371/41 |
| 5,633,683 A | 5/1997 | Rosengren et al. | |
| 5,687,167 A | 11/1997 | Bertin et al. ................ 370/254 |
| 5,699,365 A | 12/1997 | Klayman et al. .............. 371/55 |
| 5,699,369 A | 12/1997 | Guha .......................... 371/41 |
| 5,790,546 A | 8/1998 | Dobbins et al. | |
| 5,793,436 A | 8/1998 | Kim .......................... 348/497 |
| 5,808,662 A | 9/1998 | Kinney et al. ................. 348/15 |
| 5,815,145 A | 9/1998 | Matthews ..................... 345/327 |
| 5,870,087 A | 2/1999 | Chau ......................... 715/202 |
| 5,913,031 A | 6/1999 | Blanchard | |
| 5,949,795 A | 9/1999 | Moroney et al. | |
| 6,016,166 A | 1/2000 | Huang et al. ................ 348/515 |
| 6,101,221 A | 8/2000 | Varanasi et al. ............. 375/240 |
| 6,118,498 A | 9/2000 | Reitmeier | |
| 6,119,092 A | 9/2000 | Patwardhan et al. ........ 704/503 |
| 6,173,115 B1 | 1/2001 | Willis ........................ 386/125 |
| 6,252,849 B1 | 6/2001 | Rom et al. | |
| 6,278,716 B1 | 8/2001 | Rubenstein et al. ......... 370/432 |
| 6,307,839 B1 | 10/2001 | Gerszberg et al. ........... 370/235 |
| 6,310,918 B1 | 10/2001 | Saha et al. ............. 375/240.16 |
| 6,453,471 B1 | 9/2002 | Klosterman | |
| 6,480,541 B1 | 11/2002 | Girod et al. ............ 375/240.12 |
| 6,510,553 B1 | 1/2003 | Hazra .......................... 725/87 |

(Continued)

FOREIGN PATENT DOCUMENTS

EP 0 714 192 5/1996

(Continued)

OTHER PUBLICATIONS

Office Action for EP 07 812 632.3 dated Apr. 22, 2009.

(Continued)

*Primary Examiner*—Sam Rizk
(74) *Attorney, Agent, or Firm*—Merchant & Gould (57) ABSTRACT

In one embodiment, among others, a method for executing a change from one communication channel to another includes receiving a channel-change indication and obtaining data and FEC that corresponds to the data. The data and FEC are related to a new channel, and the data includes a portion of data within a data packet. By utilizing the FEC, the method further includes recreating portions of data of the data packet that were missed due to the channel-change indication occurring in the middle of the transmission of the data packet. As an example, the data packet can be associated with video data arranged in a group of pictures (GOP) structure.

19 Claims, 5 Drawing Sheets

U.S. PATENT DOCUMENTS

| | | |
|---|---|---|
| 6,538,992 B1 | 3/2003 | Subbiah et al. ............. 370/230 |
| 6,594,798 B1 | 7/2003 | Chou et al. |
| 6,628,301 B1 | 9/2003 | Colin et al. ................. 345/716 |
| 6,665,751 B1 | 12/2003 | Chen et al. ..................... 710/52 |
| 6,678,332 B1 | 1/2004 | Gardere et al. ......... 375/240.26 |
| 6,701,528 B1 * | 3/2004 | Arsenault et al. ............. 725/89 |
| 6,763,019 B2 | 7/2004 | Mehta et al. ................. 725/88 |
| 6,792,047 B1 | 9/2004 | Bixby et al. ........... 375/240.26 |
| 6,871,006 B1 | 3/2005 | Oguz et al. ................... 386/68 |
| 6,973,667 B2 | 12/2005 | Fritsch ......................... 725/88 |
| 7,017,102 B1 | 3/2006 | Kristensson et al. ........ 714/786 |
| 7,054,643 B2 | 5/2006 | Trossen et al. ............... 455/454 |
| 7,065,779 B1 | 6/2006 | Crocker et al. |
| 7,073,117 B1 | 7/2006 | Ireland et al. ............... 714/786 |
| 7,096,481 B1 | 8/2006 | Forecast et al. ............... 725/32 |
| 7,113,484 B1 | 9/2006 | Chapman et al. |
| 7,114,172 B2 | 9/2006 | Lord ........................... 725/80 |
| 7,228,356 B2 | 6/2007 | Nguyen et al. ............... 709/231 |
| 7,266,127 B2 | 9/2007 | Gupta et al. ................. 370/413 |
| 7,281,058 B1 | 10/2007 | Shepherd et al. ............. 709/238 |
| 7,412,149 B2 | 8/2008 | Cohen et al. ................... 386/68 |
| 7,433,946 B2 | 10/2008 | Shen et al. |
| 7,447,978 B2 | 11/2008 | Hannuksela ............... 714/776 |
| 7,477,653 B2 | 1/2009 | Smith et al. ................. 370/432 |
| 7,490,344 B2 | 2/2009 | Haberman et al. .......... 370/432 |
| 7,584,404 B2 * | 9/2009 | Kozintsev et al. ........... 714/776 |
| 7,610,606 B2 | 10/2009 | Carlucci et al. ............... 725/95 |
| 7,620,294 B2 | 11/2009 | Green et al. ................. 725/98 |
| 7,725,797 B2 | 5/2010 | Ver Steeg ................... 714/751 |
| 7,729,590 B2 | 6/2010 | Kosugi ......................... 386/68 |
| 7,742,407 B2 | 6/2010 | Versteeg et al. ............. 370/230 |
| 2001/0025378 A1 | 9/2001 | Sakamoto et al. |
| 2002/0019853 A1 | 2/2002 | Vange et al. |
| 2002/0056107 A1 | 5/2002 | Schlack et al. ................. 725/35 |
| 2002/0057367 A1 | 5/2002 | Baldock ...................... 348/554 |
| 2002/0067909 A1 | 6/2002 | Iivonen ....................... 386/88 |
| 2002/0129129 A1 | 9/2002 | Bloch et al. ................. 717/175 |
| 2002/0181454 A1 | 12/2002 | Norman et al. |
| 2002/0184637 A1 | 12/2002 | Perlman ....................... 725/87 |
| 2002/0199203 A1 | 12/2002 | Duffy et al. |
| 2003/0002849 A1 | 1/2003 | Lord ........................... 386/46 |
| 2003/0007212 A1 | 1/2003 | Sala et al. ..................... 398/72 |
| 2003/0007507 A1 | 1/2003 | Rajwan et al. ............... 370/468 |
| 2003/0007508 A1 | 1/2003 | Sala et al. ................... 370/468 |
| 2003/0007724 A1 | 1/2003 | Gummalla et al. ............. 385/24 |
| 2003/0014752 A1 | 1/2003 | Zaslavsky et al. ............. 725/40 |
| 2003/0048808 A1 | 3/2003 | Stahl et al. .................. 370/408 |
| 2003/0133458 A1 | 7/2003 | Sato et al. ................... 370/395 |
| 2003/0156218 A1 | 8/2003 | Laksono ..................... 709/231 |
| 2003/0159143 A1 | 8/2003 | Chan ......................... 725/41 |
| 2003/0188253 A1 | 10/2003 | Kauschke et al. ............. 714/755 |
| 2003/0188311 A1 | 10/2003 | Yuen et al. ................... 725/42 |
| 2003/0196211 A1 | 10/2003 | Chan ......................... 725/131 |
| 2003/0200551 A1 | 10/2003 | Kang ......................... 725/120 |
| 2003/0217365 A1 | 11/2003 | Caputo ....................... 725/95 |
| 2004/0111470 A1 | 6/2004 | Poulsen et al. ............... 709/204 |
| 2004/0133907 A1 | 7/2004 | Rodriguez et al. |
| 2004/0184776 A1 | 9/2004 | Inoue et al. ................... 386/83 |
| 2004/0194147 A1 | 9/2004 | Craven et al. ............... 725/111 |
| 2004/0204945 A1 | 10/2004 | Okuda et al. ............... 704/500 |
| 2004/0226044 A1 | 11/2004 | Goode ......................... 725/95 |
| 2004/0228277 A1 | 11/2004 | Williams |
| 2004/0260814 A1 | 12/2004 | Budge et al. ................. 709/227 |
| 2005/0155075 A1 | 7/2005 | Crichton ..................... 725/105 |
| 2005/0166242 A1 | 7/2005 | Matsumoto et al. ........... 725/88 |
| 2005/0172326 A1 | 8/2005 | Jerding et al. ............... 725/116 |
| 2005/0190781 A1 | 9/2005 | Green et al. |
| 2005/0204251 A1 | 9/2005 | Moon et al. |
| 2005/0228892 A1 | 10/2005 | Riley et al. ................. 709/228 |
| 2005/0289618 A1 | 12/2005 | Hardin ........................ 725/95 |
| 2005/0289623 A1 | 12/2005 | Midani et al. ............... 725/100 |
| 2006/0013247 A1 | 1/2006 | Kotch et al. .................. 370/437 |
| 2006/0025149 A1 | 2/2006 | Karaoguz et al. ........ 455/452.2 |
| 2006/0074968 A1 | 4/2006 | Gyetko ........................ 707/102 |
| 2006/0080707 A1 | 4/2006 | Laksono ....................... 725/38 |
| 2006/0112325 A1 | 5/2006 | Ducheneaut et al. ...... 715/500.1 |
| 2006/0212917 A1 | 9/2006 | Boucher et al. ............. 725/105 |
| 2006/0236358 A1 | 10/2006 | Liu et al. .................... 725/117 |
| 2006/0242240 A1 | 10/2006 | Parker et al. |
| 2007/0002789 A1 | 1/2007 | Zhang ........................ 370/328 |
| 2007/0044130 A1 | 2/2007 | Skoog ......................... 725/110 |
| 2007/0098015 A1 | 5/2007 | Eijsberg ..................... 370/468 |
| 2007/0104226 A1 | 5/2007 | Ver Steeg et al. ........... 370/485 |
| 2007/0106782 A1 | 5/2007 | Ver Steeg et al. ........... 709/224 |
| 2007/0107023 A1 | 5/2007 | Ver Steeg et al. ............. 725/95 |
| 2007/0107024 A1 | 5/2007 | Ver Steeg et al. ............. 725/95 |
| 2007/0130393 A1 | 6/2007 | Ver Steeg ................... 710/57 |
| 2007/0186228 A1 | 8/2007 | Ramaswamy et al. ......... 725/14 |
| 2007/0192812 A1 * | 8/2007 | Pickens et al. ................ 725/94 |
| 2007/0220577 A1 | 9/2007 | Kongalath ................... 725/131 |
| 2007/0261087 A1 | 11/2007 | Denney et al. ................ 725/95 |
| 2008/0008167 A1 | 1/2008 | Ver Steeg ................... 370/389 |
| 2008/0022190 A1 | 1/2008 | Ver Steeg ................... 714/776 |
| 2008/0022320 A1 | 1/2008 | Ver Steeg ................... 725/78 |
| 2008/0028279 A1 | 1/2008 | Ver Steeg ................... 714/776 |
| 2008/0028280 A1 | 1/2008 | Ver Steeg ................... 714/776 |
| 2008/0134005 A1 | 6/2008 | Izzat et al. .................. 714/774 |
| 2008/0192820 A1 | 8/2008 | Brooks et al. .......... 375/240.02 |
| 2008/0229379 A1 | 9/2008 | Akhter ....................... 725/139 |
| 2008/0244667 A1 | 10/2008 | Osborne ...................... 725/94 |
| 2008/0244679 A1 | 10/2008 | Sukumar et al. ............. 725/121 |
| 2009/0007199 A1 | 1/2009 | La Joie ........................ 725/95 |
| 2009/0031342 A1 | 1/2009 | Ver Steeg et al. ............. 725/38 |
| 2009/0031392 A1 | 1/2009 | Ver Steeg et al. ............. 725/151 |
| 2009/0222875 A1 | 9/2009 | Cheng et al. ................ 725/147 |
| 2010/0046634 A1 * | 2/2010 | Dai et al. ................ 375/240.25 |

FOREIGN PATENT DOCUMENTS

| | | |
|---|---|---|
| EP | 1294193 | 3/2003 |
| WO | WO 99/09741 | 2/1999 |
| WO | WO 2005/020556 | 3/2005 |
| WO | WO 2006/019505 | 2/2006 |
| WO | WO 2006/061765 | 6/2006 |
| WO | WO 2007/111693 | 10/2007 |
| WO | WO 2007/111695 | 10/2007 |
| WO | WO 2007/111697 | 10/2007 |
| WO | WO 2007/120260 | 10/2007 |
| WO | WO 2007/120261 | 10/2007 |
| WO | WO 2008/006011 | 1/2008 |
| WO | WO 2008/006012 | 1/2008 |
| WO | WO 2008/006013 | 1/2008 |
| WO | WO 2008/006014 | 1/2008 |
| WO | WO 2008/048828 | 4/2008 |
| WO | WO 2008/118678 | 10/2008 |
| WO | WO 2008/121545 | 10/2008 |
| WO | WO 2009/018042 | 2/2009 |
| WO | WO 2009/018043 | 2/2009 |

OTHER PUBLICATIONS

U.S. Official Action dated Nov. 23, 2009 in U.S. Appl. No. 11/164,115.

U.S. Official Action dated Nov. 24, 2009 in U.S. Appl. No. 10/119,700.

U.S. Official Action dated Dec. 21, 2009 in U.S. Appl. No. 11/428,336.

U.S. Official Action dated Jan. 6, 2010 in U.S. Appl. No. 11/691,565.

U.S. Official Action dated Jan. 14, 2010 in U.S. Appl. No. 11/164,110.

U.S. Official Action dated Jan. 22, 2010 in U.S. Appl. No. 11/164,119.

De M Cordeiro C. et al. "Establishing a Trade-off Between Unicast and Multicast Retransmission Modes for Reliable Multicast Proto- cols." Modeling, Analysis and Simulation of Computer and Telecommunication Systems, Aug. 29, 2000, pp. 85-91, XP010515402.
Gemmell, Jim. "Scalable Reliable Multicast Using Erasure-Correcting Re-sends." Microsoft Research, Technical Report MSR-TR-97-20, [Online] Jun. 30, 1997, pp. 1-15, XP002461839.
Lee, Min Jeong et al. "Performance Improvements of Wireless IP Multicast Conference System based on Designated Receivers." IEEE International Conference on Atlanta, GA USA, vol. 2, Jun. 7, 1998-Jun. 11, 1998, pp. 807-811, XP010284688.
Nonnenmacher, J. et al. "Parity-Based Loss Recovery for Reliable Multicast Transmission." IEEE/ACM Transactions on Networking, vol. 6, No. 4, Aug. 1998, pp. 349-361, XP000771969.
Paul, Sanjoy et al. "Reliable Multicast Transport Protocol (RMTP)" IEEE Journal on Selected Areas in Communications, vol. 15, No. 3, Apr. 1997, XP011054624.
Rizzo, Luigi et al. "RMDP: An FEC-based Reliable Multicast Protocol for Wireless Environments." Mobile Computing and Communications Review, vol. 2, No. 2, Apr. 1998, pp. 23-31, XP000738504.
U.S. Official Action dated Jan. 29, 2010 in U.S. Appl. No. 11/692,457.
U.S. Official Action dated Feb. 19, 2010 in U.S. Appl. No. 11/164,147.
U.S. Official Action dated Feb. 26, 2010 in U.S. Appl. No. 11/482,438.
International Preliminary Report dated Feb. 2, 2010, PCT/US2008/070851.
International Preliminary Report dated Feb. 2, 2010, PCT/US2008/070853.
Canadian Office Action dated Feb. 8, 2010, Application No. 2,663,907.
Jean-Louis Gaureau, et al: Optimal Coding Rate of Punctured Convolutional Codes in Multiservice Wireless Cellular Systems: IEEE Transactions on Vehicular Technology, IEEE Service Center, Piscataway, NJ, vol. 48, No. 1, Jan. 1999, XP011063794, p. 117.
U.S. Appl. No. 10/080,380, filed Feb. 21, 2002, Entitled "Systems and Methods for Generating a Real-Time Video Program Guide Through Video Access of Multiple Channels," Inventor: Peter Chan.
U.S. Appl. No. 10/119,700, filed Apr. 10, 2002, Entitled "Systems, Methods and Apparatuses for Simulated Rapid Tuning of Digital Video Channels," Inventor: Peter Chan.
U.S. Appl. No. 11/164,102, filed Nov. 10, 2005, Entitled "Quality of Service Management in a Switched Digital Video Environment," Inventors: William C. VerSteeg, et al.
U.S. Appl. No. 11/164,110, filed Nov. 10, 2005, Entitled "Channel Changes Between Services with Differing Bandwidth in a Switched Digital Video System," Inventors: William C. VerSteeg, et. al.
U.S. Appl. No. 11/164,115, filed Nov. 10, 2005, Entitled "Atomic Channel Changes in a Switched Digital Video System," Inventors: William C. VerSteeg, et. al.
U.S. Appl. No. 11/164,119, filed Nov. 10, 2005, Entitled "Bandwidth Management in Each Network Device in a Switched Digital Video Environment," Inventors: William C. VerSteeg, et. al.
US Appl. No. 11/164,147, filed Nov. 11, 2005, Entitled "Expedited Digital Signal Decoding," Inventor: William C. VerSteeg.
U.S. Appl. No. 11/428,336, filed Jun. 30, 2006, Entitled "Systems and Methods of Synchronizing Media Streams," Inventor: William C. VerSteeg.
U.S. Appl. No. 11/829,255, filed Jul. 27, 2007, Entitled "Systems and Methods of Differentiated Channel Change Behavior," Inventors: William C. VerSteeg, et al.
U.S. Appl. No. 11/829,274, filed Jul. 27, 2007, Entitled "Systems and Methods of Differentiated Requests for Network Access," Inventors: William C. VerSteeg et. al.
Sherer, et al. "Appendix A Low Bandwidth Low Latency Channel Change," U.S. Appl. No. 60/719,146, filed Sep. 21, 2005.
European Patent Application, EP 1 335 521, Oct. 24, 2002.
European Patent Application, EP 1 589 706, Apr. 19, 2004.
European Patent Application, EP 1 684 450, Oct. 26, 2004.
U.S. Official Action dated Mar. 5, 2007 in U.S. Appl. No. 10/080,380.
U.S. Official Action dated Sep. 19, 2007 in U.S. Appl. No. 10/080,380.
U.S. Official Action dated Dec. 14, 2007 in U.S. Appl. No. 10/119,700.
U.S. Official Action dated Feb. 22, 2008 in U.S. Appl. No. 11/164,147.
U.S. Official Action dated Apr. 8, 2008 in U.S. Appl. No. 10/080,380.
U.S. Official Action dated Jul. 1, 2008 in U.S. Appl. No. 10/119,700.
U.S. Official Action dated Jul. 11, 2008 in U.S. Appl. No. 11/164,110.
U.S. Official Action dated Aug. 21, 2008 in U.S. Appl. No. 11/428,336.
U.S. Official Action dated Sep. 3, 2008 in U.S. Appl. No. 11/164,115.
U.S. Official Action dated Sep. 19, 2008 in U.S. Appl. No. 11/164,102.
U.S. Official Action dated Sep. 26, 2008 in U.S. Appl. No. 11/164,147.
U.S. Official Action dated Nov. 17, 2008 in U.S. Appl. No. 10/119,700.
U.S. Official Action dated Dec. 1, 2008 in U.S. Appl. No. 10/080,380.
U.S. Official Action dated Jan. 8, 2009 in U.S. Appl. No. 11/164,110.
U.S. Official Action dated Jan. 9, 2009 in U.S. Appl. No. 11/164,119.
U.S. Official Action dated Feb. 2, 2009 in U.S. Appl. No. 11/482,439.
U.S. Official Action dated Feb. 12, 2009 in U.S. Appl. No. 11/428,336.
U.S. Official Action dated Feb. 19, 2009 in U.S. Appl. No. 11/164,115.
U.S. Official Action dated Mar. 18, 2009 in U.S. Appl. No. 11/164,147.
U.S. Official Action dated Mar. 24, 2009 in U.S. Appl. No. 11/164,102.
U.S. Official Action dated Apr. 29, 2009 in U.S. Appl. No. 11/692,457.
U.S. Official Action dated Apr. 30, 2009 in U.S. Appl. No. 10/119,700.
U.S. Official Action dated Jun. 23, 2009 in U.S. Appl. No. 11/428,336.
U.S. Official Action dated Jun. 23, 2009 in U.S. Appl. No. 11/691,565.
U.S. Official Action dated Jul. 17, 2009 in U.S. Appl. No. 11/164,119.
U.S. Official Action dated Jul. 27, 2009 in U.S. Appl. No. 11/164,147.
U.S. Official Action dated Jul. 31, 2009 in U.S. Appl. No. 11/482,439.
U.S. Official Action dated Aug. 5, 2009 in U.S. Appl. No. 11/164,115.
U.S. Official Action dated Aug. 5, 2009 in U.S. Appl. No. 11/164,110.
U.S. Official Action dated Aug. 18, 2009 in U.S. Appl. No. 11/164,102.
U.S. Official Action dated Sep. 11, 2009 in U.S. Appl. No. 11/482,437.
U.S. Official Action dated Sep. 18, 2009 in U.S. Appl. No. 11/482,436.
U.S. Official Action dated Sep. 18, 2009 in U.S. Appl. No. 11/482,438.
U.S. Official Action dated Oct. 20, 2009 in U.S. Appl. No. 11/692,457.
International Search Report dated Oct. 29, 2007, PCT/US2006/060713.
International Search Report dated Dec. 10, 2007, PCT/US2007/072825.
International Search Report dated Dec. 20, 2007, PCT/US2006/060703.
International Search Report dated Dec. 20, 2007, PCT/US2006/060709.
International Search Report dated Jan. 11, 2008, PCT/US2007/072819.
International Search Report dated Feb. 15, 2008, PCT/US2007/072820.
International Search Report dated May 6, 2008, PCT/US2007/072822.
International Search Report dated May 23, 2008, PCT/US2007/080869.
International Search Report dated Jul. 10, 2008, PCT/US08/070851.
International Search Report dated Jul. 10, 2008, PCT/US08/070853.
International Search Report dated Jul. 15, 2008, PCT/US2006/060695.
International Search Report dated Jan. 16, 2008, PCT/US2006/060700.
International Search Report dated Sep. 22, 2008, PCT/US2008/057296.

International Search Report dated Nov. 12, 2008, PCT/US2008/057297.
Written Opinion dated Oct. 29, 2007, PCT/US2006/060713.
Written Opinion dated Dec. 20, 2007, PCT/US2006/060703.
Written Opinion dated Dec. 20, 2007, PCT/US2006/060709.
Written Opinion dated Jan. 16, 2008, PCT/US2006/060700.
Written Opinion dated Feb. 15, 2008, PCT/US2007/072820.
Written Opinion dated May 22, 2008, PCT/US2006/060703.
Written Opinion dated Jul. 10, 2008, PCT/US2008/070851.
Written Opinion dated Jul. 15, 2008, PCT/US2006/060695.
Written Opinion dated Sep. 22, 2008, PCT/US2008/057296.
Written Opinion dated Nov. 12, 2008, PCT/US2008/057297.
Written Opinion dated Apr. 30, 2009, PCT/US2007/080869.
Office Action for EP 06 850 729.2 dated Jan. 27, 2009.
Office Action for EP 07 840 350.8 dated Apr. 28, 2009.
Office Action for EP 07 812 635.6 dated May 6, 2009.
Office Action for EP 06 850 128.7 dated Jul. 17, 2009.
Office Action for EP 07 812 631.5 dated Oct. 2, 2009.
Office Action for EP 07 812 632.3 dated Oct. 23, 2009.
"Digital Video Broadcasting (DVB); DVB-H Implementation Guidelines European Broadcasting Union, Union Europeenne de Radio-Television EBUUER; ETSI TR 102 377" ETSI Standards, Lis, vol. BC, No. V1.2.1, Nov. 1, 2005, XP014032216, ISSN: 0000-0001, pp. 27, 59.
Bormans J. et al., "Video coding with H.264/AVC: tools, performance, and complexity" IEEE Circuits and Systems Magazine, IEEE Service Center, New York, NY, US, vol. 4, No. 1, Jan. 1, 2004, pp. 7-28, XP011111220, ISSN: 1531-636X.
Shoaf et al. "IGMP Capabilities in Broadband Network Architercures", Whitepaper Juniper Networks, Mar. 1, 2005, pp. 1-25, XP002999116, pp. 1-31.
Cain et al.: "Internet Group Management Protocol, Version 3; rfc3376.txt" IETF Standard, Internet Engineering Task Force, IETF, CH, Oct. 1, 2002, XP015009135, ISSN: 000-0003, pp. 1-47.
Liu Wenjie et al.: "Prioritized admission strategy in a clustered video-on-demand system", IEEE Tencon'02. 2002 IEEE Region 10 Conference on Computers, Communications, Control and Power Engineering Proceedings. Beijing, China , Oct. 28-31, 2002; New York, NY, vol. 1, Oct. 28, 2002, pp. 306-309, XP010628485, ISBN: 978-0-7803-7490-4.
Fitzek et al., "Error Control Teqhniques for Efficient Multicast Streaming in UMTS Networks"; Proceeding of Systemics, Cybernetics and Informatics SCI 2003 [Online] 2003, XP002477506 Orlando, Florida USA. Retrieved from the Internet URL:http//kom.aau.dk/ {ff/documents/SCI_2003.pdf> [retrieved on Apr. 21, 2008] pp. 4-5, figure 4.
Rummler et al., "Performance of Parity-Based Loss Recovery for Reliable Multicast in Third-General Mobile Networks"; Personal, Indoor and Mobile Radio Communications, 2005. PIMRC 2005. IEEE 16th International Symposium on Berlin, Germancy Sep. 11-14, 2005, Piscataway, NJ, USA, IEEE Sep. 11, 2005; pp. 1641-1645, XP010926492.
Rubenstein et al., "Improving Reliable Multicast Using Active Parity Encoding Services"; (APES), 1999, IEEEE, pp. 1248-1255.
Kemdore, R.G. "Scoped Hybrid Automatic Repeat reQuest with Forward Error Correction (SHARQFEC)." Computer Communication Review, ACM, New York, NY, vol. 28, No. 4, Oct. 1998, pp. 278-289, XP000914442.
Lacher, M.S. et al. "Performance Comparison of Centralized Versus Distributed Error Recovery for Reliable Multicast." IEEE/ACM Transactions on Networking, IEEE/ACM, New York, NY, vol. 8, No. 2, Apr. 2000, XP011038850.
U.S. Appl. No. 11/482,439, filed Jul. 7, 2006, Entitled "Determining Strategy for Multicast and/or Unicast Transmission to Correct Forward Errors." Inventor: William C. Ver Steeg.
U.S. Appl. No. 11/482,438, filed Jul. 7, 2006, Entitled "Transmitting Additional Forward Error Correction (FEC) Upon Request." Inventor: William C. Ver Steeg.
U.S. Appl. No. 11/482,436, filed Jul. 7, 2006, Entitled "Requesting Additional Forward Error Correction." Inventor: William C. Ver Steeg.
U.S. Appl. No. 11/482,437, filed Jul. 7, 2006, Entitled "Buffer for Storing Data and Forward Error Correction (FEC)." Inventor: William C. Ver Steeg.
U.S. Official Action dated Mar. 24, 2010 in U.S. Appl. No. 11/829,255.
U.S. Official Action dated Mar. 25, 2010 in U.S. Appl. No. 11/829,274.
U.S. Official Action dated May 10, 2010 in U.S. Appl. No. 11/164,115.
U.S. Official Action dated Jun. 3, 2010 in U.S. Appl. No. 11/428,336.
U.S. Official Action dated Jun. 7, 2010 in U.S. Appl. No. 11/482,439.
Office Action for EP 07 844 052.6 dated May 18, 2010.
U.S. Official Action dated Jun. 22, 2010 in U.S. Appl. No. 11/164,119.
U.S. Official Action dated Jun. 23, 2010 in U.S. Appl. No. 11/691,565.
Office Action for EP 07 812 632.3 dated Apr. 19, 2010.
U.S. Official Action dated Jul. 22, 2010 in U.S. Appl. No. 11/692,457.
Chinese Patent Application, CN 1509027A, Jun. 30, 2004.
U.S. Official Action dated Sep. 1, 2010 in U.S. Appl. No. 11/829,255.
Canadian Office Action dated Jul. 30, 2010, Application No. 2,629,310.
Chinese Office Action dated Aug. 10, 2010, Application No. 200780038707.X.
U.S. Official Action dated Sep. 17, 2010 in U.S. Appl. No. 11/829,274.
U.S. Official Action dated Sep. 27, 2010 in U.S. Appl. No. 11/692,457.
U.S. Official Action dated Oct. 15, 2010 in U.S. Appl. No. 11/428,336.
Canadian Office Action dated Sep. 1, 2010, Application No. 2,629,320.
U.S. Official Action dated Nov. 1, 2010 in U.S. Appl. No. 11/164,119.

* cited by examiner

| (0, 0) | (0, 1) | (0, 2) | (0, 3) | ... | (0, C) | XOR ((0, 0) – (0, C)) |
|---|---|---|---|---|---|---|
| (1, 0) | (1, 1) | (1, 2) | (1, 3) | ... | (1, C) | XOR ((1, 0) – (1, C)) |
| (2, 0) | (2, 1) | (2, 2) | (2, 3) | ... | (2, C) | XOR ((2, 0) – (2, C)) |
| (3, 0) | (3, 1) | (3, 2) | (3, 3) | ... | (3, C) | XOR ((3, 0) – (3, C)) |
| ⋮ | ⋮ | ⋮ | ⋮ | ⋱ | ⋮ | |
| (R, 0) | (R, 1) | (R, 2) | (R, 3) | ... | (R, C) | XOR ((R, 0) – (R, C)) |
| XOR ((0, 0) – (R, 0)) | XOR ((0, 1) – (R, 1)) | XOR ((0, 2) – (R, 2)) | XOR ((0, 3) – (R, 3)) | | XOR ((0, C) – (R, C)) | |

REDUCING CHANNEL-CHANGE TIME

TECHNICAL FIELD

The present disclosure generally relates to systems and methods for processing communication signals. More particularly, the disclosure relates to reducing the time that it takes to change from one communication channel to another.

BACKGROUND

In the field of communication systems, many signals, such as audio and video signals, can be transmitted within different frequency channels. A receiving device is able to tune to a particular frequency allowing reception of the respective signals transmitted within that frequency. In systems involving the transmission of image data, for example, signals, such as those adhering to MPEG-2 standards, can be grouped into data packets, often referred to as a "group of pictures" (GOP). The structure of a GOP usually includes a header, a data section, and a trailer. The data section of the GOP structure typically includes a single "intra-frame" (I-frame) and a number of "forward predicted frames" (P-frames) and "bi-directionally predicted frames" (B-frames). An I-frame typically includes enough data to create a single frame by itself. P-frames are encoded to include difference values with respect to the data from one or more previous frames. B-frames are encoded to include difference values with respect to the data from one or more frames both before and after the B-frame.

When a receiver changes, or tunes to, a new channel, it is unlikely that the time instant of the channel change will correspond with the beginning of the GOP structure of the new channel. Hence, it is unlikely that the I-frame of the present GOP will be fully decoded. As a result, the receiver will typically be unable to decode the present GOP and will be required to wait for the next full GOP. Therefore, changing from one channel to another may take an undesirable length of time, which can be unacceptable to viewers. Given that the GOP is 15 frames and the frame rate is 30 frame per second, for example, the time between leaving one channel and displaying a frame of the new channel may be close to one second in a worst case scenario. Thus, a need exists to address these and other deficiencies and inadequacies of the present technologies to improve channel-change times.

BRIEF DESCRIPTION OF THE DRAWINGS

Many aspects of the embodiments disclosed herein can be better understood with reference to the following drawings. Like reference numerals designate corresponding parts throughout the several views.

DETAILED DESCRIPTION

In typical communication systems, packets of data are transmitted between various devices. A data packet usually includes a header, data section, and a trailer, wherein the header contains information that directs the packet to the correct receiver or receivers. The header may also include information that can be used to determine a number of packets being transmitted within a data stream. For example, a sequence number may be used for each packet to indicate the sequence of the packet within the stream. Because of any number of problems that may be encountered in a communication system, however, some packets of data may not reach their intended destinations. As a result of a receiver missing a number of packets and the information not reaching its intended destination, the integrity of the communication system may be compromised.

One solution for handling the problem of missed packets is to send "forward error correction" (FEC) code corresponding to the data. Typically, the FEC code is transmitted immediately after the transmission of data and is applied on a different multicast channel. If a device receiving the data and FEC determines that it has missed one or more packets, then the device uses the FEC code to attempt to correct the missing packets and fill in the gaps.

Not only can the FEC code be used for correcting errors, but the present disclosure also describes systems and methods for utilizing FEC in a communication system to reduce channel-change times. In this respect, the FEC code can function to correct errors as needed and to also fill in missing data due to a channel change when a new data stream is joined in the middle of a group of pictures (GOP).

Figure 1:
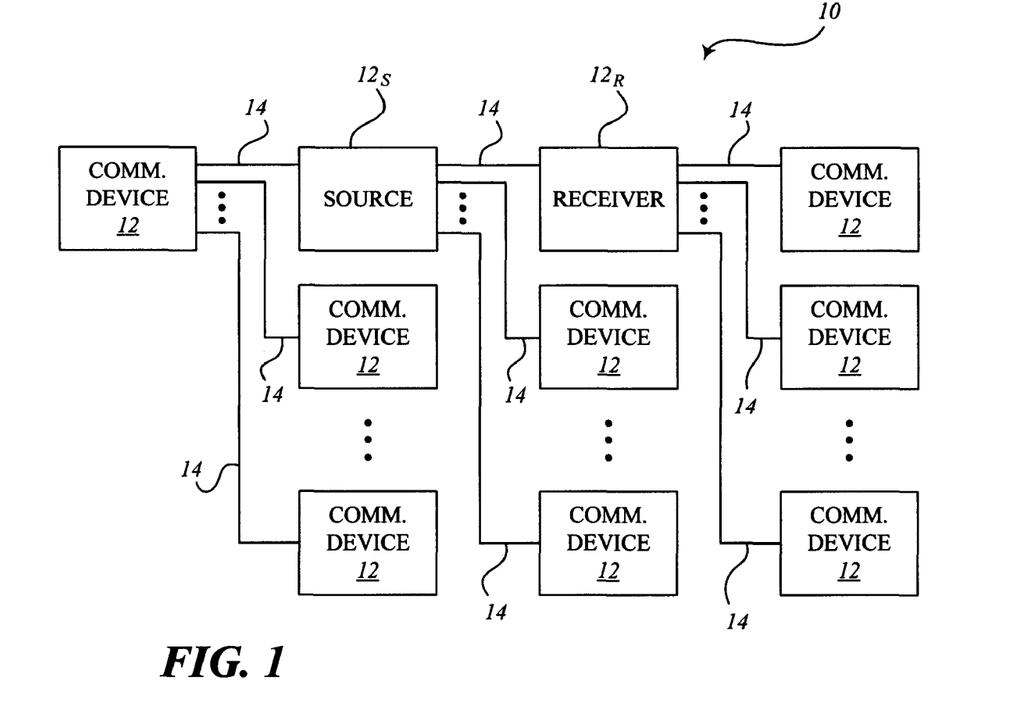
FIG. 1 is a block diagram of an embodiment of a communication system.

FIG. 1 is a block diagram of an embodiment of a communication system 10. The communication system 10 may be any system or network for transferring data, such as, for example, an Internet protocol television (IPTV) network for carrying digital video signals. The communication system 10 may transfer audio and video signals, encoded and compressed, for example, according to established standards, e.g. MPEG-2. When one or more data packets do not reach their intended destinations, the communication system 10 attempts to compensate for the missed packets. In this embodiment, the communication system 10 includes a number of communication devices 12 arranged in a multicast configuration. Regarding multicast schemes, certain communication devices 12 can create copies of the data and transmit the data to a group of destinations simultaneously over multiple communication links 14.

For the purpose of illustration, one communication device in FIG. 1 is labeled "source" $12_S$ and another communication device is labeled "receiver" $12_R$. The source $12_S$ may be any component in the communication system 10 that transmits data downstream to another device. The source $12_S$ may be, among others, an edge device, multiplexer, encoder, etc. The source $12_S$ may be located in a head-end, central office, or other location, and/or may receive data from other sources. The source $12_S$ may also transmit, along with the data, a certain amount of FEC code to one or more intended recipients. Data is transmitted on one multicast channel while the FEC code is typically transmitted on a different multicast channel.

The receiver $12_R$ may be any component in the communication system 10 that receives data from an upstream device.

The terms "upstream" and "downstream" are used herein to refer to transfer of signals in one particular direction and are merely used for illustrative purposes. However, it should be recognized that data transfer might be directed in the opposite direction such that a downstream device transmits data to an upstream device. The receiver $12_R$ may be, among others, an end device, such as a computer, set-top box (STB), modem, etc. The receiver $12_R$ may be located in a customer premises, such as a home, office, school, etc., and/or may distribute data to other downstream receivers.

The communication link 14 between the source $12_S$ and receiver $12_R$ can be any suitable transmission path or channel and may contain transmission lines, wireless channels, fiber optic, or combinations of these or other types of communication links. Also, other communication devices 12 may be communicatively interposed between the source 12s and receiver $12_R$. In addition, the source and receiver may be located anywhere in the communication system 10 and separated by any distance.

Typically, data is transmitted to a group of receivers in a first multicast group. A certain amount of FEC code, transmitted with the data, is sent in a second multicast group. As described in more detail below, the timing of the FEC code with respect to the data is managed in order to reduce the channel-change time. Normally, the receivers configured to tune to the first multicast group are also configured to tune to the second multicast group to receive both data and FEC code. The particular use of multicast channels may be dependent upon the last-mile technology of the communication system 10.

In the present disclosure, the source $12_S$ and receiver $12_R$, and portions thereof, can be implemented in hardware, software, firmware, or a combination thereof. If the source $12_S$ and receiver $12_R$ contain software or firmware for performing the disclosed functions, the software or firmware may be stored in a memory and executed by a suitable instruction execution system. If implemented in hardware, the source $12_S$ and receiver $12_R$ can be implemented, for example, with discrete logic circuitry, an application specific integrated circuit (ASIC), a programmable gate array (PGA), a field programmable gate array (FPGA), or any suitable combination of logic components.

Figure 2:
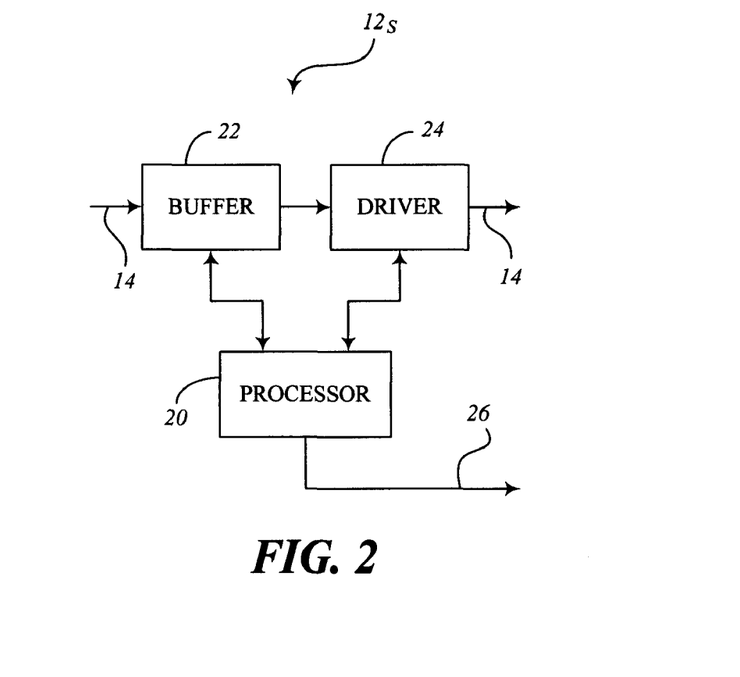
FIG. 2 is a block diagram of an embodiment of the source shown in FIG. 1.

FIG. 2 is a block diagram of an embodiment, illustrated in a simplified form, of the source $12_S$ shown in FIG. 1. The source $12_S$ may be configured to operate in conjunction with the receiver $12_R$ as described below with respect to FIG. 4 or with any suitable receiver having corresponding circuitry and/or functionality for receiving data and FEC code. The source $12_S$ may be a multiplexer, digital subscriber line access multiplexer (DSLAM), decoder, router, digital contact manager (DCM), video acceleration module (VAM), edge device, or other communication device that transfers data to another location or component. As an example, the source $12_S$ may be located at a head-end facility, central office, node, or at other locations in the communication system 10.

In this embodiment, the source $12_S$ includes, among other things, a processor 20, a buffer 22, and a driver 24. Normally, the buffer 22 receives streams of data packets from another source or group of sources. The driver 24 may include any suitable component or combination of components for outputting, driving, or transmitting signals to one or more destination devices. The driver 24 may be configured to communicate with one receiver, or, in the case of a multicast system, with multiple receivers.

The processor 20 is configured to access the packets from the buffer 22 and calculate FEC code designed to overcome a certain amount of missed data. It should be understood, however, that the processor 20 may use any suitable algorithms for creating the FEC. The processor 20 stores the calculated FEC code in the buffer 22. Also, the processor instructs the driver 24 to transmit the data packets and FEC from the buffer 22 along the communication link 14 to the receiver $12_R$ or receivers. The driver 24 is configured to transmit the FEC in a time-delayed manner with respect to the corresponding data. In some embodiments, the FEC is transmitted with an offset in time of about half of a GOP length. In this way, the FEC, in addition to correcting error, can also be used to reduce the time that it takes to change from one channel to another, as is explained in more detail below. In some embodiments, however, the FEC may be interleaved with the data or appended to the data and transmitted on the same multicast channel. However, other transmission techniques may be used as well. Also, the relationship between the time of transmission of the data and the time of transmission of the FEC may be variable and may depend on other factors as described herein.

Figure 5:
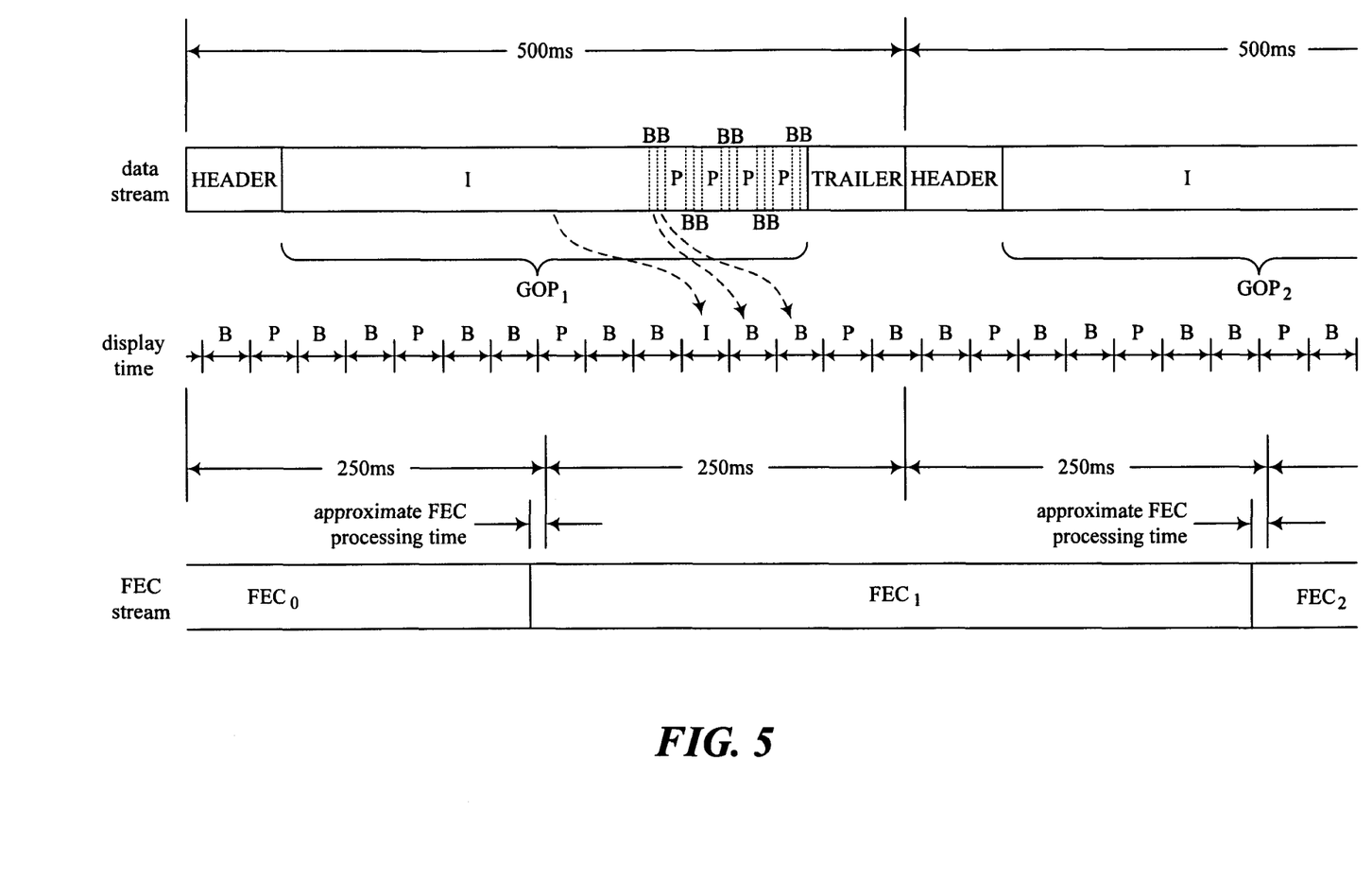
FIG. 5 is a timing diagram illustrating an example of a GOP structure and a corresponding FEC.

The processor 20 is also configured to encode the data in a GOP structure, which is established for each particular channel. The GOP structure includes a header, the GOP data, and a trailer, as depicted in FIG. 5. The GOP data may include any number of frames. A first frame is referred to as an intra-frame, or I-frame, which maintains much of its original form without significant compression. The GOP data also includes forward prediction frames (P-frames) and bidirectional prediction frames (B-frames). P-frames are encoded based on the difference values of previous frames and B-frames are encoded based on the difference values of previous and/or later frames. The algorithms for encoding and compressing frames to achieve P-frames and B-frames are more complex than those for I-frames, but the resulting bandwidth of P-frames and B-frames is less than the bandwidth of the I-frames, thereby allowing for the transmission of an entire GOP structure that can be used to produce high quality pictures.

The processor 20 also encodes the header of the GOP structure, which includes information that defines a relationship between the GOP data and the FEC. The header is also encoded with synchronization information that described how the GOP is protected. For example, the synchronization information may include information related to the delay between a particular frame of the GOP and its associated FEC data. Based on this information, the receiver $12_R$ can align the FEC with the GOP to fill in any gaps where the GOP data is missed due to errors. In the additional occurrence of a channel change, the FEC is used to fill in portions of the GOP that were missed due to joining the stream in the middle of the GOP. The GOP structure also includes header and trailer information that defines the boundaries of the data stream packets.

Figure 3:
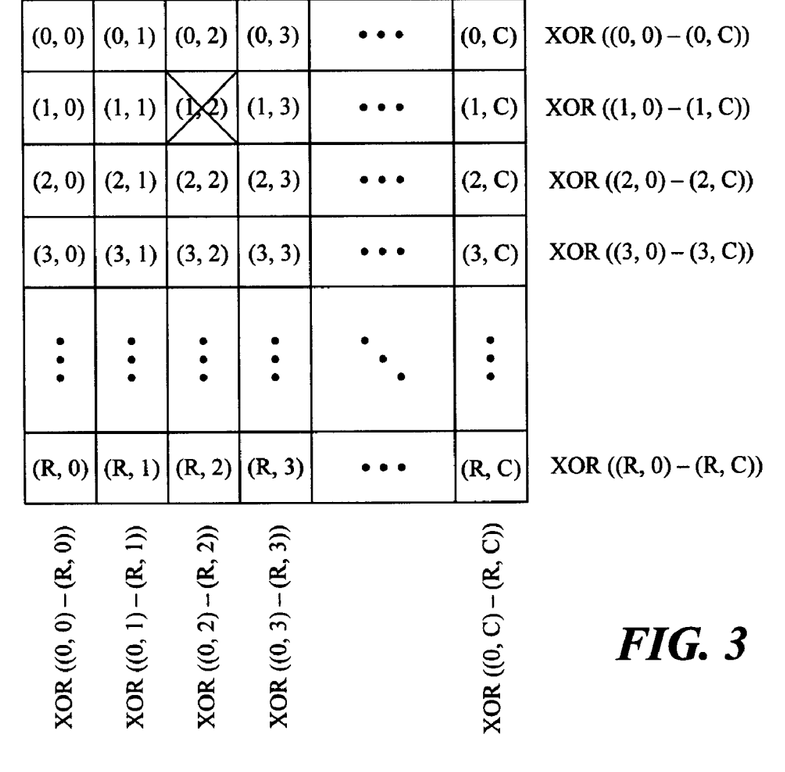
FIG. 3 is a diagram illustrating exemplary forward error correction for an array of data packets.

In particular, the source $12_S$ receives or acquires data in any suitable manner and processes the data to determine FEC code. The FEC code may be in any suitable form created using any suitable encoding algorithm or combination of algorithms, such as Pro-MPEG, Raptor, or others. For example, the data packets may be laid out in an array having R rows and C columns, as depicted in FIG. 3. In a simple PRO-MPEG algorithm, for example, the FEC may be calculated by determining an exclusive-OR (XOR) of the packets in each row to achieve a number R of row XORs and an XOR of the packets in each column to achieve a number C of column XORs. In this example, the total number of FEC portions is R+C, which is sufficient, in some scenarios, to handle up to R+C missed packets, which is an extremely deep FEC. If packet (1, 2) were dropped, for example, the dropped packet can be restored using packets (1, 0), (1, 1), (1, 3)

through (1, C), and XOR ((1, 0)-(1, C)). Instead of using the row XOR and other packets of the row, packet (1, 2) can also be restored using the packets of the same column and the column XOR.

Figure 4:
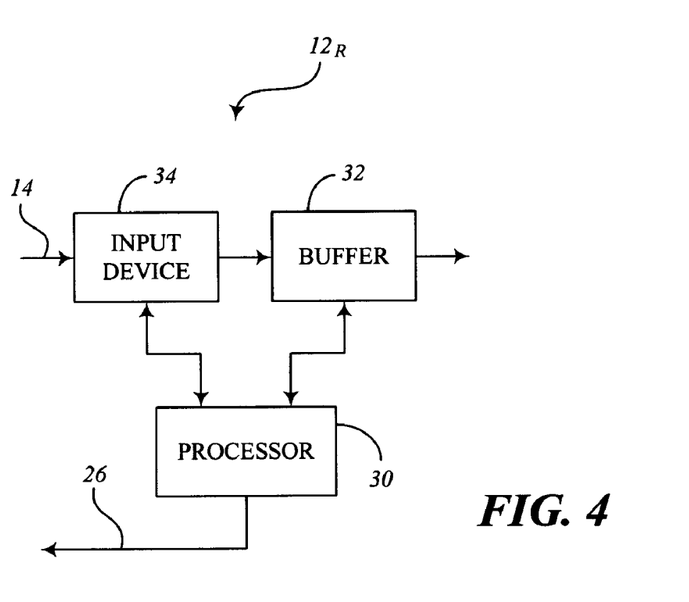
FIG. 4 is a block diagram of an embodiment of the receiver shown in FIG. 1.

FIG. 4 is a block diagram of an embodiment, illustrated in a simplified form, of the receiver $12_R$ shown in FIG. 1. In some embodiments, for example, the receiver $12_R$ may operate in conjunction with the source $12_S$ shown in FIG. 2 or with another respective source having related functionality for transmitting data and corresponding FEC that is offset in time to reduce channel-change times. The receiver $12_R$ may be configured as or incorporated within, among other devices, a set-top box, computer, modem, VAM, etc. In this embodiment, the receiver $12_R$ includes, among other things, a processor 30, a buffer 32, and an input device 34.

The input device 34 may include one or more tuners for tuning to a particular frequency channel, which may correspond to a "television channel", for example. When the FEC is transmitted on a multicast channel that is different from the channel of the corresponding data, the input device 34 includes at least one tuner for each respective channel. In some embodiments, the GOP and FEC are transmitted on the same channel and the input device 34 may include a single tuner in this case. When the input device 34 receives the incoming data packets and FEC, the data and FEC can be stored in the buffer 32.

In normal operation, the processor 30 accesses the data and FEC from the buffer 32 to determine the condition of the received data. By analyzing the header, or particularly the sequence numbers in the headers of the data packets, to determine the packets that were transmitted, the processor 30 can determine if any packets were not received. If the FEC is sufficient to recover the missed packet or packets, then the transmission is considered a success. In this case, the data packets are corrected or restored, if necessary, and transmitted to the next communication device 12, if any, in the communication system 10. Regarding embodiments in which the receiver $12_R$ is a set-top box or other similarly functioning device, the processor 30 decodes the frames of the GOP and stores frame data in a frame buffer (not shown) of the buffer 32. The frame data can then be read out to a television set (not shown) or other display device at designated time intervals, e.g. 30 frames per second.

For purposes of illustration, the GOP as defined in the embodiments described herein includes 15 frames. However, it should be understood that the GOP may be set with any number of frames. For a 15-frame GOP used in a system that displays 30 frames per second, the GOP is decoded and displayed within about 500 ms, or about half a second. When a channel change occurs, the time of the change may be any time during the 500 ms GOP band. However, since the frames cannot usually be decoded without the I-frame, if all or part of the I-frame is missed, then the receiver of the prior art is forced to wait until the next GOP is received. In this respect, the channel change may take up to 900 ms, which may be undesirable for most viewers.

To overcome this problem, the present disclosure provides a way to utilize the FEC to fill in the data of the intermediate GOP tuned to in midstream. When the FEC lags the GOP by about 250 ms, then 500 ms worth of data can read in about 250 ms, where about half of the data or more is decoded from the GOP itself while up to about half of the data is decoded from the FEC. Since the FEC can be decoded in about 10 ms, the FEC may be shifted forward in time to compensate for the decoding time. In this way, the FEC is effectively offset by about half the bandwidth of the GOP. The processor 30 decodes the GOP and FEC simultaneously during a channel change and can fill the buffer 32 in about 250 ms or less. Using this process, the present disclosure can provide channel-change times that, even in the worst case, may be up to a half second or more faster than the worst case of the prior art. This results in a more responsive channel-changing process, which is likely to be more desirable for a viewer.

The data size, or "quanta", of the GOP may be variable, since it is based on scene complexity. The GOP data may be transmitted using a constant bit rate (CBR) or a variable bit rate (VBR). In a CBR stream, the transmission time, or "protection period", taken to send the quanta is directly proportional to the quanta. In a VBR stream, the protection period is variably proportional to the quanta. The time offset of the FEC with respect to the GOP is dependent on the protection period, which is dependent on the quanta. The FEC may be encoded such that it is capable of being used during a channel-change event that just misses the I-frame. In this disclosure, "just missing" the I-frame may be a time of channel change that occurs within about 0-100 ms after the end of the I-frame.

The processor 30 is also configured to determine whether to decode using the GOP, FEC, or both, during a channel change event. Also, the processor 30 also determines what proportion of each to decode. The processor 30 may include or access software for determining which code or portions of code to use. By receiving a quanta worth of data, the processor 30 can generate the GOP frames and fill the buffer 32 in about 250 ms.

In addition, while processing the GOP frames of the initially-tuned-to intermediate GOP, the processor 30 is further capable of determining where the channel change occurred with respect to the entire length of GOP. In this respect, only the last frames of the GOP are stored in the buffer 32, as subsequently displayed, wherein the number of the last frames depends on where the channel change occurred. Therefore, when the first whole GOP structure is received and decoded without the assistance of the FEC, provided that no error correction is needed, then the I-frame of the next GOP structure is displayed immediately after the last P-frame or B-frame of the previous GOP. Otherwise, a noticeably distracting skip in time may occur after a channel change.

The method of processing the GOP and FEC during a channel change event may comprise an ordered listing of executable instructions for implementing logical functions as discussed above. The instructions and programs for executing these functions can be embodied in any computer-readable medium for use in or by an instruction execution system, apparatus, or device. In the context of this document, a "computer-readable medium" can be any medium that can contain, store, communicate, propagate, or transport the program for use by the instruction execution system, apparatus, or device. The scope of the present disclosure is intended to include the functionality of the disclosed embodiments configured with logic in hardware and/or software mediums.

FIG. 5 is a chart illustrating exemplary timing characteristics of GOP structures and FEC. Each GOP structure includes a header, GOP data, and a trailer. In this illustration, $GOP_1$ is shown in a stream with other GOP structures. Each GOP structure may be about 500 ms, but may be variable based on the complexity of the scenes. For example, when the frames include simple images and do not change significantly from frame to frame, the coding of the GOP can be simple. However, when the frames include a greater amount of image complexity and/or a greater amount of movement or scene changing, for example, then the coding of the GOP can be more complex.

The GOP data in this example includes 15 frames having a pattern of I-frames, B-frames, and P-frames of IBB_PBB_PBB_PBB_PBB. This pattern or other patterns may be used and are usually established on a per-channel basis. When a channel change occurs, the processor 30 decodes either the header of the GOP or the header information decoded from the lagging FEC. From the information decoded from the header, the processor 30 can determine the number of frames in the new channel's GOP and its pattern of frames. From the header, the processor 30 can also determine the relationship between the GOP and FEC, such as lag time, etc.

Since the quanta of the GOP may be variable, the header and trailer may be adjusted as needed to fill the 500 ms timeframe. Also, the bit rate may be changed as needed to maintain a constant stream. Alternatively, the GOP structures may slightly overlap if necessary. In this case, some data may be dropped.

As an example, FIG. 5 also illustrates 15 time periods spanning 500 ms and representing an example of the frame display times. For example, when the I-frame is processed, the frame can be displayed in time period "I". The two subsequent B-frames can be displayed in time periods $B_1$ and $B_2$. The next frame (a P-frame) can be displayed in time period $P_1$, and so on. Once the I-frame is completely received, the processing for this frame can begin. The processing time may be different from the time shown and may be faster or slower than the illustrated timing.

It can be appreciated from observing the timing characteristics of the example illustration of FIG. 5 that a channel change may occur during the reception of the I-frame. In this case, the prior art may be forced to wait until the next 500 ms interval before a new GOP is received. In this disclosure, however, portions of the I-frame may be missed when encoding the GOP, but the missed data can be picked up and decoded using the time-delayed FEC, which includes enough data to recreate the GOP structure. For example, $FEC_1$ represents the FEC that corresponds to $GOP_1$ and lags the GOP by about 250 ms. In some embodiments, the FEC may be placed to account for just missing the I-frame. In some instances, the I-frame of the GOP may be received in full, but other times the I-frame may be missed partially or totally. When the I-frame is missed partially, the portion of the FEC related to the missed part of the I-frame can be used to augment the I-frame to enable recreation of the I-frame. In the case of the I-frame being totally missed, the FEC related to the I-frame can be used to completely recreate the I-frame. The FEC may also be used to recreate, partially or totally, the P-frames and B-frames as needed.

In addition, the FEC is encoded to include substantially the same timing characteristics as the GOP and is substantially similar to the GOP with respect to quanta, protection period, bit rate, etc. When the FEC is substantially equal in bandwidth to the GOP, the lag time may be about 250 ms. To account for the extra time to process the FEC, an approximate shift may be made to the FEC phase. In this respect, the lag time is decreased slightly. The timing of the FEC may also depend on the protection period of the GOP. By offsetting the FEC by an ideal lag time with respect to the GOP, the time to fill the buffer 32 with 500 ms of frames (15 frames) may take as little as 250 ms.

Figure 6:
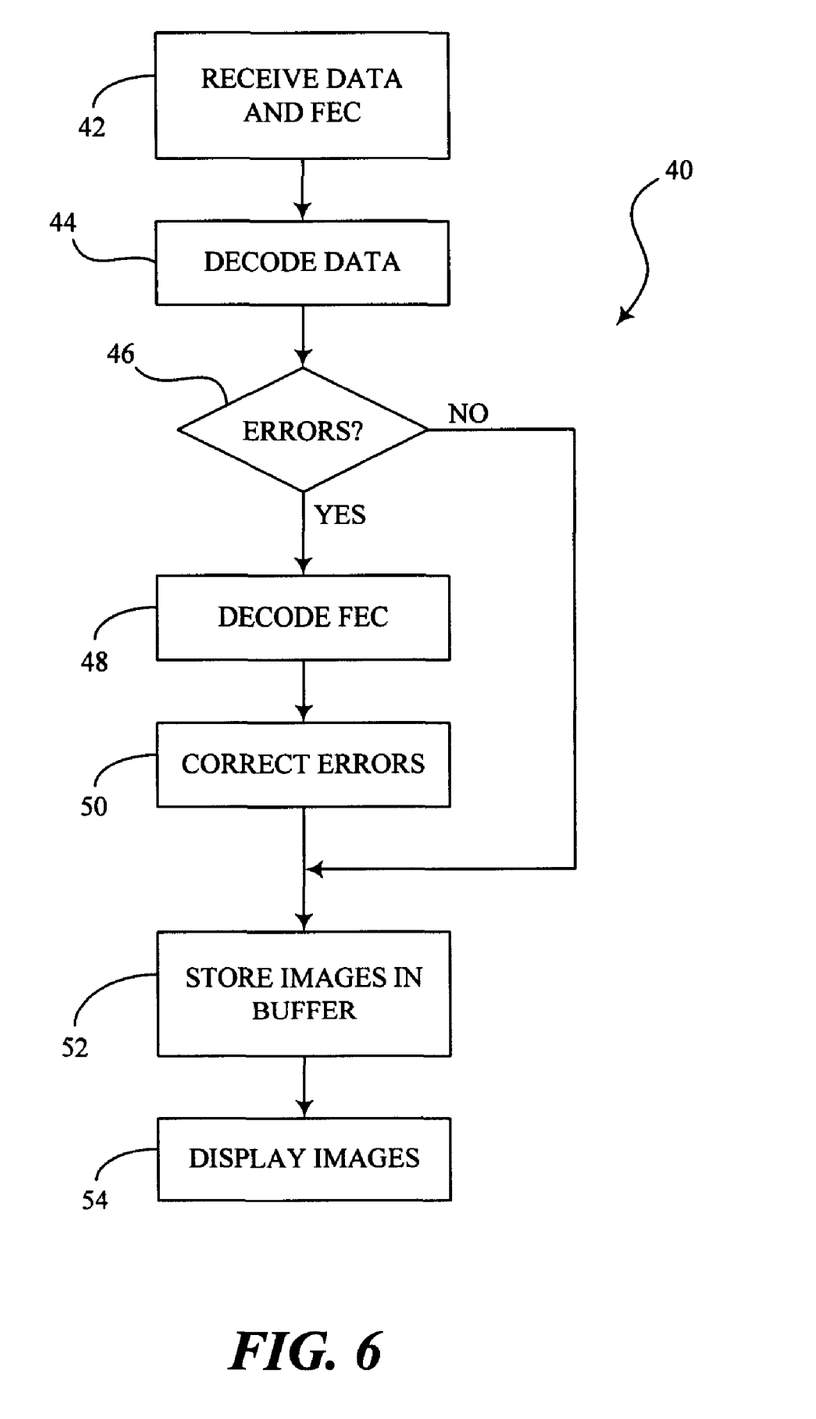
FIG. 6 is a flow chart illustrating an embodiment of a method for processing image data and FEC during normal operation.
Figure 7:
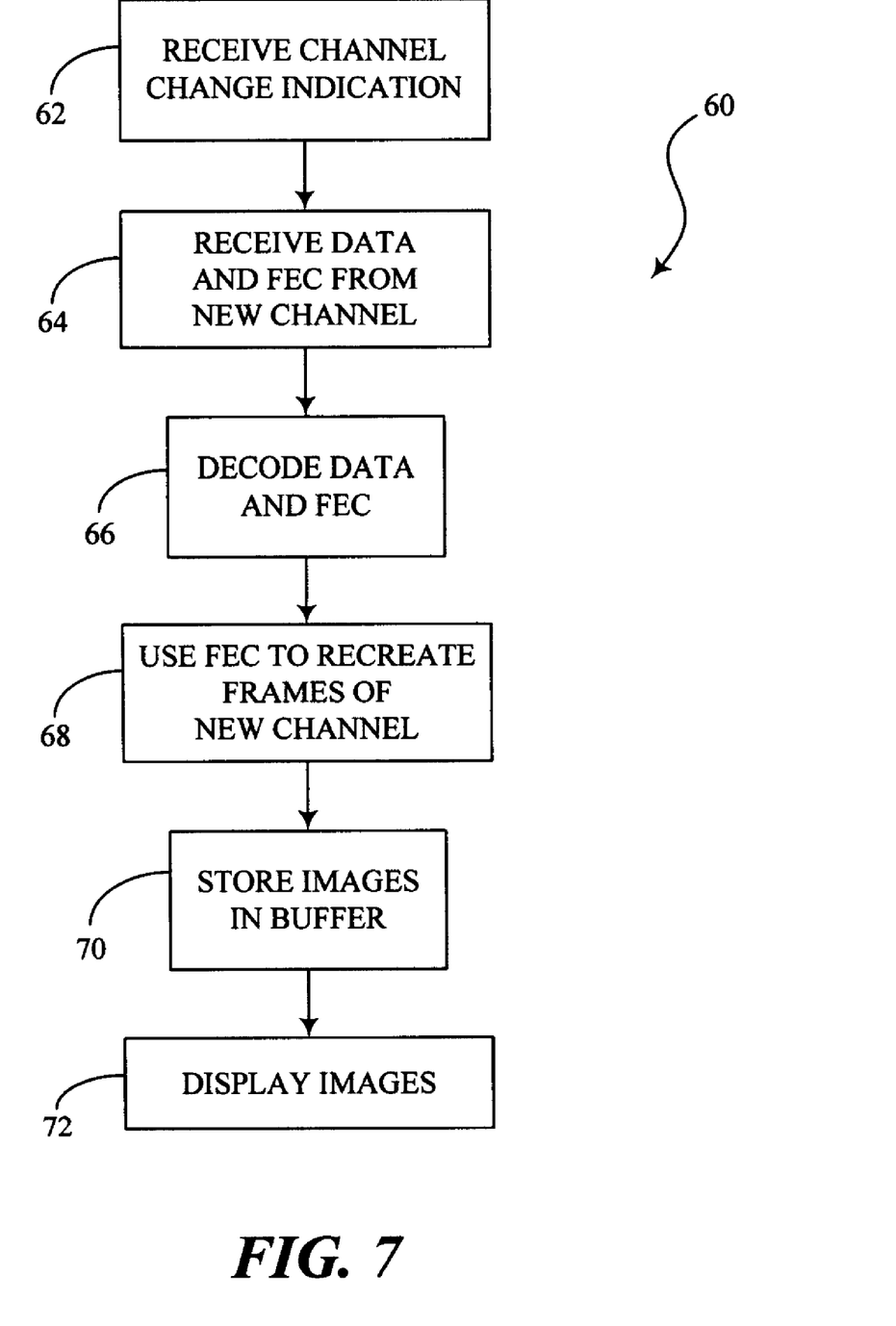
FIG. 7 is a flow chart illustrating an embodiment of a method for processing image data and FEC during a channel change event.

With respect to FIGS. 6 and 7, the functional operations of the communication system 10 is described. Although particular references may be made to the physical elements illustrated in FIGS. 1, 2, and 4, it should be understood that the following processes, steps, functions, or operations may be performed by any suitable components as will be understood by one of reasonable skill in the art.

FIG. 6 is a flow chart illustrating an embodiment of a method 40 for processing data and FEC during normal operation. The method 40 includes receiving data and FEC, as shown in block 42. The data, for example, may be audio and/or image data and may be encoded and/or compressed according to audio/video standards, such as the Moving Picture Experts Group (MPEG) standards. The data may be arranged in a GOP structure.

In block 44, the data is decoded. In decision block 46, it is determined whether or not any errors occur in the decoded data. If it is determined that there are no errors, the flow chart proceeds to block 52. If errors do exist, then the process moves to block 48, where the FEC is decoded. In block 50, the FEC is used to correct the detected errors, if possible. In block 52, the decoded data and/or restored data (from the FEC-corrected data) are stored as image data in a buffer. For example, the buffer may be a memory device having a frame buffer for storing frames. The buffer may store the images in a frame format or field format. In block 54, the frames are retrieved from the buffer and transmitted to a display device, e.g. television set, for display.

FIG. 7 is a flow chart illustrating an embodiment of a method 60 for processing data and FEC during a channel change event. For example, the method 60 may be carried out by a device that receives image data. More particular, the receiving device may be a set-top box or other suitable processing device for feeding image signals to a display device, such as a television set. The method 60 includes receiving an indication that a channel change has been requested, as indicted by block 62. For example, a viewer may request that a new channel be displayed by any number of entry mechanisms, such as pressing control buttons on the set-top box, pressing up or down buttons on a remote control, pressing number buttons on a remote control, etc.

In response to the channel-change request, the method proceeds to block 64. In this block, the receiver tunes to the new channel to receive the data. The receiver also receives corresponding FEC code. The FEC code may be transmitted on the same multicast channel as the regular data or may be transmitted on a different channel. If the FEC code is transmitted on a different channel, the receiver tunes to both the channel for the data and the FEC channel.

In block 66, the data and FEC is decoded. For example, the data and FEC may be decoded simultaneously to decrease the overall channel-change time. In block 68, the FEC is used to recreate frames of the new channel that were missed. In this respect, the FEC is preferably offset in time to allow receiving portions of the data that were transmitted (and missed) before the channel-change request. In this case, the FEC is used to help recreate earlier frames of a GOP to be used for processing the real-time frames. Since the FEC is designed to correct errors, it should be noted that during a channel change, the FEC can be used to fill in data that is missed on account of joining the data stream in the middle of the GOP.

As a result of the FEC augmenting the regular data, the receiving (block 64), decoding (block 66), and frame constructing (block 68) can be completed in about half the time that a full GOP can usually be created. In block 70, the images recreated with the help of the FEC are stored in a buffer. The buffer may be designed to be able to store the last number of frames of the particular GOP that was tuned to midstream when the channel change is initially requested. In block 72, the images are read out of the buffer and transmitted to a display device, which displays the images.

The flow charts illustrated in FIGS. 6 and 7 show the architecture, functionality, and operation of possible implementations of the communication system. In this regard, each block may represent a module, segment, or portion of code, which may be configured in software. Each block comprises one or more executable instructions for implementing the specified logical function(s). It should also be noted that in some alternative embodiments, the functions noted in the blocks may occur out of the order shown or described or may not occur at all. In addition, two or more blocks may be executed substantially concurrently, depending upon the functionality involved. Alternative embodiments are considered to be included within the scope of the present disclosure as would be understood by those reasonably skilled in the art.

Conditional language, such as "can," "could," "might," or "may," among others, is generally intended to convey, unless specifically stated otherwise, or otherwise understood within the context, that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. An apparatus for processing image data, the apparatus comprising:
   a buffer configured to receive image signals from one or more sources;
   a processor configured to encode the image signals to create a group of pictures (GOP) structure, the GOP structure including a header, a data portion, and a trailer, wherein the processor is further configured to encode the image signals to create forward error correction (FEC) capable of correcting errors in the GOP structure, wherein the processor is configured to encode the header to include information pertaining to the relationship between the GOP structure and the FEC; and
   a driver configured to transmit the GOP structure and FEC, wherein the FEC lags the GOP structure by an amount that allows a device receiving the GOP structure and FEC to utilize both the GOP structure and FEC during a channel-change event in order to decrease a channel-change time.

2. The apparatus of claim 1, wherein the apparatus is embodied within a head-end facility.

3. The apparatus of claim 1, wherein the GOP structure includes between 12 and 30 frames.

4. The apparatus of claim 1, wherein the driver is configured to transmit the FEC with a lag time that lags the GOP structure by an amount depending on the protection period of the GOP structure.

5. The apparatus of claim 4, wherein the lag time is equal to about one-half of the protection period of the GOP structure.

6. The apparatus of claim 4, wherein the lag time is further dependent on a time to process the FEC.

7. A set-top box comprising:
   an input device for receiving a group of pictures (GOP) structure and forward error correction (FEC) code, wherein the FEC code is offset, with respect to time, from the GOP structure; and
   a processor configured to decode the GOP structure and FEC during a channel-change event, wherein the processor is configured to encode a header of the GOP to include information pertaining to the relationship between the GOP structure and the FEC.

8. The set-top box of claim 7, wherein the processor uses the FEC to assist in recreating a quanta of the GOP.

9. The set-top box of claim 8, whereby the quanta of the GOP is recreated in about a half of a protection period of the quanta during the change-change event.

10. The set-top box of claim 7, further comprising a buffer for storing frames to be displayed on a display device.

11. The set-top box of claim 7, wherein the processor performs an algorithm to determine which portions of the GOP structure and FEC to use to calculate an I-frame of a GOP tuned to during the channel-change event.

12. A method for executing a change from one communication channel to another, the method comprising:
   receiving a channel-change indication;
   obtaining data and obtaining forward error correction (FEC) that corresponds to the data, wherein the data and FEC are related to a new channel, and the data includes a portion of data within a data packet;
   utilizing the FEC to recreate portions of data of the data packet that were missed due to the channel-change indication occurring in the middle of the transmission of the data packet; and
   encoding the header of the data packet to include information pertaining to the relationship between the GOP structure and the FEC.

13. The method of claim 12, wherein the data packet is associated with video data arranged in a group of pictures (GOP) structure.

14. The method of claim 13, wherein utilizing the FEC to recreate portions of the data further comprises recreating frames for display on a display device.

15. The method of claim 14, further comprising:
   storing the frames in a frame buffer.

16. The method of claim 13, further comprising:
   utilizing the obtained data and FEC until a quanta of data of the GOP is created.

17. The method of claim 16, further comprising:
   determining which portions of the data and FEC to utilize to reduce a channel-change time.

18. The method of claim 12, wherein obtaining the FEC includes obtaining the FEC at a time that lags the time that the data is obtained by about one-half of the period of the data packet.

19. The method of claim 12, further comprising:
   determining whether or not errors exist in the data packet; and utilizing the FEC to correct errors in the data packet when it is determined that errors exist.

* * * * *